(12) United States Patent
Sergeev

(10) Patent No.: US 10,896,337 B2
(45) Date of Patent: Jan. 19, 2021

(54) METHOD FOR CLASSIFYING A TRAFFIC SIGN, OR ROAD SIGN, IN AN ENVIRONMENT REGION OF A MOTOR VEHICLE, COMPUTATIONAL APPARATUS, DRIVER ASSISTANCE SYSTEM AND MOTOR VEHICLE

(71) Applicant: Valeo Schalter und Sensoren GmbH, Bietigheim-Bissingen (DE)

(72) Inventor: Nikolai Sergeev, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 83 days.

(21) Appl. No.: 16/337,700

(22) PCT Filed: Sep. 28, 2017

(86) PCT No.: PCT/EP2017/074652
§ 371 (c)(1),
(2) Date: Mar. 28, 2019

(87) PCT Pub. No.: WO2018/060344
PCT Pub. Date: Apr. 5, 2018

(65) Prior Publication Data
US 2020/0034641 A1    Jan. 30, 2020

(30) Foreign Application Priority Data

Sep. 29, 2016 (DE) .......................... 10 2016 118 538

(51) Int. Cl.
*G06K 9/00* (2006.01)
*G06T 7/70* (2017.01)
(Continued)

(52) U.S. Cl.
CPC ....... *G06K 9/00818* (2013.01); *G06K 9/3241* (2013.01); *G06T 7/70* (2017.01);
(Continued)

(58) Field of Classification Search
CPC .... G06K 9/00818; G06K 9/3241; G06T 7/70; G06T 207/30236; G06T 2207/30252; G08G 1/09623
(Continued)

(56) References Cited

U.S. PATENT DOCUMENTS 8,064,643 B2 * 11/2011 Stein .................. G06K 9/00818
382/104
8,233,660 B2 * 7/2012 Fritsch .................... G06T 7/254
382/103
(Continued)

FOREIGN PATENT DOCUMENTS

DE    102007021576 A1    11/2008
DE    102012110595 A1    5/2014
(Continued)

OTHER PUBLICATIONS

International Search Report and Written Opinion in corresponding International Application No. PCT/EP2017/074652, dated Jan. 3, 2018 (15 pages).

*Primary Examiner* — Marceau Milord
(74) *Attorney, Agent, or Firm* — Osha Bergman Watanabe & Burton LLP

(57) ABSTRACT

The invention relates to a method for classifying a traffic sign (7) in an environment region (4) of a motor vehicle (1) as a traffic sign sticker (9) located on an industrial or commercial vehicle (10) or as a stationary traffic sign (8), wherein in the method at least one first image (11, 12) of the environment region (4), captured by a camera (3) of the motor vehicle (1), is received and the traffic sign (7) is
(Continued)

recognized in the at least one first image (11, 12), wherein a geometric dimension (D1', D2') of the traffic sign (7) in the first image (11, 12) is determined on the basis of said first image (11, 12), a first reference dimension (Dmin, Dmax), which is characteristic of a stationary traffic sign (8), is prescribed for the captured traffic sign (7), a first position (Pmin, Pmax) of the traffic sign (7) in the environment region (4) is estimated based on the geometric dimension (D1', D2') of the traffic sign (7) in the first image (11, 12) and on the basis of the first reference dimension (Dmin, Dmax), and the traffic sign (7) is classified as the traffic sign sticker (9) or as the stationary traffic sign (8) based on the estimated first position (Pmin, Pmax). The invention additionally relates to a computational apparatus (6), a driver assistance system (2) and a motor vehicle (1).

13 Claims, 3 Drawing Sheets

(51) Int. Cl.
  *G06K 9/32* (2006.01)
  *G08G 1/0962* (2006.01)
(52) U.S. Cl.
  CPC .......... *G08G 1/09623* (2013.01); *G06T 2207/30236* (2013.01); *G06T 2207/30252* (2013.01)
(58) Field of Classification Search
  USPC .......................................... 382/104
  See application file for complete search history.

(56) References Cited

U.S. PATENT DOCUMENTS

| | | | | |
|---|---|---|---|---|
| 8,254,635 B2* | 8/2012 | Stein | ............... | G06K 9/209 382/103 |
| 8,812,226 B2* | 8/2014 | Zeng | ............... | G01S 13/931 701/301 |
| 8,818,042 B2* | 8/2014 | Schofield | ............ | B60W 30/143 382/104 |
| 8,917,169 B2* | 12/2014 | Schofield | ............. | B60S 1/0885 340/425.5 |
| 8,993,951 B2* | 3/2015 | Schofield | ........... | G06K 9/00791 250/208.1 |
| 9,030,558 B2* | 5/2015 | Wuerz-Wessel | ..... | G06K 9/6228 348/148 |
| 9,171,217 B2* | 10/2015 | Pawlicki | ............ | B60K 31/0008 |
| 9,418,303 B2* | 8/2016 | Zobel | ....................... | G06K 9/42 |
| 9,436,879 B2* | 9/2016 | Zobel | ................ | G08G 1/09623 |
| 9,436,880 B2* | 9/2016 | Bos | ........................ | B60N 2/002 |
| 9,487,235 B2* | 11/2016 | Bajpai | ................. | B62D 15/025 |
| 9,491,450 B2* | 11/2016 | Kussel | ................ | H04N 17/002 |
| 9,499,114 B2* | 11/2016 | Gross | ................... | B60W 50/14 |
| 9,558,412 B2* | 1/2017 | Ogawa | ................ | H04N 5/23229 |
| 9,697,430 B2* | 7/2017 | Kristensen | ........... | G06K 9/3241 |
| 2009/0074249 A1* | 3/2009 | Moed | ................. | G06K 9/00818 382/104 |
| 2010/0225762 A1* | 9/2010 | Augst | ....................... | B60R 1/12 348/148 |
| 2012/0128210 A1* | 5/2012 | Zobel | ................ | G06K 9/00818 382/103 |
| 2012/0162429 A1* | 6/2012 | Wuerz-Wessel | ............................ | G06K 9/00818 348/148 |
| 2013/0016216 A1* | 1/2013 | Nentwig | ............ | G06K 9/00805 348/148 |
| 2015/0278615 A1* | 10/2015 | Ogawa | ............... | H04N 5/23229 348/148 |

FOREIGN PATENT DOCUMENTS

| | | |
|---|---|---|
| DE | 102014217877 A1 | 3/2015 |
| DE | 102015003963 A1 | 8/2015 |
| DE | 102014220571 A1 | 4/2016 |
| DE | 102015112289 A1 | 2/2017 |
| EP | 1327969 A1 | 7/2003 |

* cited by examiner

METHOD FOR CLASSIFYING A TRAFFIC SIGN, OR ROAD SIGN, IN AN ENVIRONMENT REGION OF A MOTOR VEHICLE, COMPUTATIONAL APPARATUS, DRIVER ASSISTANCE SYSTEM AND MOTOR VEHICLE

The invention relates to a method for classifying a traffic sign in an environment region of a motor vehicle as a traffic sign sticker located on an industrial or commercial vehicle or as a stationary traffic sign, wherein in the method at least one first image of the environment region, captured by a camera of the motor vehicle, is received and the traffic sign is recognized in the at least one first image. The invention additionally relates to a computational apparatus, a driver assistance system, and a motor vehicle having a driver assistance system.

In this document, the interest is focused on driver assistance systems for motor vehicles in the form of what are known as traffic sign recognition systems. In such traffic sign recognition systems, generally an environment region of the motor vehicle is monitored using a camera of the motor vehicle. Based on the images captured by the camera, traffic signs in the environment region can be read using image recognition algorithms. Meanings of the traffic signs, for example a maximum speed limit on a road on which the motor vehicle travels, can be recognized, and an assistance function can be provided by the driver assistance system on that basis. Such an assistance function can be, for example, a display of the traffic sign or a notice relating to the meaning of the traffic sign for a driver of the motor vehicle on a display device of the vehicle. A vehicle speed can also be automatically regulated, as the assistance function, in dependence on the currently valid maximum speed that has been captured based on the traffic sign.

However, a problem arises when said traffic signs captured by the cameras are what are known as traffic sign stickers, which are found on industrial or commercial vehicles, such as lorries, buses or trailers. In this case, the meaning of the traffic sign is geared at the industrial vehicle, since it describes for example a permissible maximum speed for the industrial vehicle. In other words, the meaning of the traffic sign is irrelevant for the motor vehicle and is therefore to be disregarded by the driver assistance system. However, the recognized traffic sign must to this end first be identified as a traffic sign sticker. In this respect, U.S. Pat. No. 8,064,643 B2 describes a method for recognizing traffic signs on the basis of images of an environment region of a motor vehicle using a computer-based system of the motor vehicle. In order to recognize a traffic sign that is located on an industrial vehicle or truck, the truck is additionally recognized. However, such a method can have the disadvantage that, if detection of the industrial vehicle is too slow, the driver of the motor vehicle is already informed about the traffic sign on the industrial vehicle before the industrial vehicle has been recognized. Additional problems arise when the driver assistance system is not designed to recognize and classify industrial vehicles as such.

It is an object of the present invention to provide a solution for how captured traffic signs in an environment region of a motor vehicle can be classified particularly accurately, quickly and reliably.

This object is achieved according to the invention by way of a method, by way of a computational apparatus, by way of a driver assistance system and by way of a motor vehicle in accordance with the respectively independent claims. Advantageous embodiments of the invention are the subject matter of the dependent claims, of the description and of the figures.

According to an embodiment of a method for classifying a traffic sign in an environment region of a motor vehicle as a traffic sign sticker located on an industrial vehicle or as a stationary traffic sign, at least one first image of the environment region, captured by a camera of the motor vehicle, is received and the traffic sign is recognized in the at least one first image. In particular, a geometric dimension of the traffic sign in the first image is determined on the basis of said first image, a first reference dimension, which is characteristic of a stationary traffic sign, is prescribed for the captured traffic sign, a first position of the traffic sign in the environment region is estimated based on the geometric dimension of the traffic sign in the first image and on the basis of the first reference dimension, and the traffic sign is classified as the traffic sign sticker or as the stationary traffic sign based on the estimated first position.

According to a particularly preferred embodiment of the method for classifying a traffic sign in an environment region of a motor vehicle as a traffic sign sticker located on an industrial vehicle or as a stationary traffic sign, at least one first image of the environment region, captured by a camera of the motor vehicle, is received and the traffic sign is recognized in the at least one first image. Moreover, a geometric dimension of the traffic sign in the first image is determined on the basis of said first image, a first reference dimension, which is characteristic of a stationary traffic sign, is prescribed for the captured traffic sign, a first position of the traffic sign in the environment region is estimated based on the geometric dimension of the traffic sign in the first image and on the basis of the first reference dimension, and the traffic sign is classified as the traffic sign sticker or as the stationary traffic sign based on the estimated first position.

The method can consequently be used to differentiate between traffic signs that have been affixed to industrial and commercial vehicles, for example lorries, buses or trailers, in the form of traffic sign stickers and stationary traffic signs, for example speed limit signs at the roadside. In this way, a particularly reliable driver assistance system in the form of a traffic sign recognition system can be realized in that the driver assistance system provides a predetermined assistance function only if the captured traffic sign has a relevant meaning or information for the motor vehicle. This is in particular the case whenever the traffic sign is a stationary traffic sign. Traffic sign stickers or traffic sign plaques are here understood to mean traffic signs which are located on an industrial vehicle independently of any manner of fastening and have a meaning or information characterizing the industrial vehicle. Such information can relate for example to a maximum speed permitted for the industrial vehicle on a highway, independently of the actual speed limit that applies to the highway.

To recognize the traffic sign, first the at least one first image of the environment region that is captured by the camera of the motor vehicle is received and analysed for example by a computational apparatus of the driver assistance system. The camera can be, for example, a front camera, which is arranged on the motor vehicle and designed for continuously capturing the environment region in front of the motor vehicle, for example in the form of a video sequence, while the motor vehicle is moving. The traffic sign can then be recognized in the images of the environment region by the computational apparatus, which can be integrated in a control unit of the vehicle, for example. For example, a shape of the traffic sign and the information provided by the traffic sign can be recognized on the basis of object recognition algorithms. In the case of a speed traffic sign, a circularly round shape of the speed traffic sign and numbers describing a current maximum speed or a speed limit can be recognized or identified in the at least one first image.

The traffic sign can be classified on the basis of the first position of the traffic sign in the environment region relative to the motor vehicle. The first position is estimated on the basis of the first image in particular in three-dimensional world coordinates of a world coordinate system and describes a first possible distance of the traffic sign captured from the motor vehicle. The world coordinate system can be, for example, a vehicle coordinate system having a first axis along a vehicle transverse direction, a second axis along a vehicle longitudinal direction, and a third axis along a vehicle vertical direction. The distance of the object from the motor vehicle is determined here on the basis of a size or the geometric dimension of the traffic sign in the first image in a two-dimensional image coordinate system having a horizontal image axis and a vertical image axis. It is thus possible on the basis of the two-dimensional projection of the traffic sign on the first image, for example on the basis of the two-dimensional geometric dimensions of the traffic sign on the image, to estimate the first position of the real traffic sign in the environment region. The distance of the traffic sign from the motor vehicle is thus not measured directly or immediately, for example using an expensive TOF (time of flight) camera, but can be estimated on the basis of images which are captured for example using a cost-effective monocular camera.

For estimating the first position, the first reference dimension is specified. The first reference dimension here describes a plausible dimension that is characteristic of a stationary reference traffic sign. The first reference dimension can be stored for the computational apparatus, for example can be saved in a vehicle memory device. In this way, the first position can be quickly and simply estimated on the basis of the first image and of the stored reference dimension. During the position determination, the captured traffic sign is thus assumed to be a stationary traffic sign. Using this first, estimated position in the world coordinates, which was determined on the basis of the dimension of the traffic sign in the two-dimensional image, the traffic sign can be quickly and easily classified.

It proves advantageous if a second reference dimension which is characteristic of the stationary traffic sign is specified for the captured traffic sign, a second position in the environment region is estimated on the basis of the dimension of the traffic sign in the image and on the basis of the second reference dimension, and the traffic sign is classified as the traffic sign sticker or the stationary traffic sign on the basis of the estimated first and second positions. A predetermined minimum diameter that is characteristic of the stationary traffic sign, in particular 40 cm, is preferably specified as the first reference dimension, and a predetermined maximum diameter that is characteristic of the stationary traffic sign, in particular 2 m, is specified as a second reference dimension. The invention is here based on the finding that the distance of the traffic sign cannot be determined accurately on the basis of the at least one first image which has been captured two-dimensionally by the camera, but can vary in particular along a camera axis. Two possible, plausible distances of the traffic sign from the motor vehicle are therefore estimated. In order to plausibly estimate the positions of the traffic sign in world coordinates on the basis of two-dimensional images, two different, plausible dimensions, in particular diameters, for the traffic sign are specified. The minimum and the maximum diameters can be stored in the vehicle memory device. As a result, the distances of the traffic sign from the motor vehicle can be plausibly and quickly determined without the need to measure the distance directly.

According to an embodiment of the invention, a distance between the traffic sign and the motor vehicle is determined at least on the basis of the first position, and the traffic sign is classified as the stationary traffic sign if the distance falls below a predetermined threshold value, and is classified as the traffic sign sticker if the distance at least exceeds the predetermined threshold value. In accordance with this embodiment, in particular a lateral distance of the traffic sign along a vehicle longitudinal direction of the motor vehicle is determined. The invention is here based on the finding that traffic sign stickers generally have smaller dimensions, in particular a smaller diameter, than stationary traffic signs. If the reference dimension characterizing the stationary traffic sign, for example a plausible minimum diameter, were now to be specified for the captured traffic sign, the distance determined therefrom would be unrealistically large. In other words, the traffic sign would be too far away from the motor vehicle, and consequently the information provided for the driver of the motor vehicle by the traffic sign could not be relevant. That is to say, if the determined distance exceeds the threshold value, it is assessed as being unrealistically large and it is assumed that the captured traffic sign is a traffic sign sticker on an industrial vehicle. In accordance with this embodiment, is thus possible particularly easily and reliably to classify the traffic sign on the basis of only one captured image, in particular without the need to recognize and classify the industrial vehicle itself.

Alternatively or in addition, a movement progression of the traffic sign in the images is determined in image coordinates on the basis of the first image and at least one second image, which has been captured by the camera, a first movement progression characterizing a stationary traffic sign is determined in the image coordinates proceeding from the first estimated position in the environment region, and the captured traffic sign is classified as the stationary traffic sign or as the traffic sign sticker on the basis of a comparison of the movement progression of the captured traffic sign to the first characterizing movement progression.

In accordance with this embodiment, it is thus determined whether the traffic sign is static, i.e. stationary, or dynamic. If the traffic sign has been classified as being static, it is assumed that it is the stationary traffic sign. If the traffic sign was classified as being dynamic, it is assumed that it is the traffic sign sticker on the industrial vehicle driving in front of the motor vehicle. First, a movement progression of the traffic sign is determined in the image coordinates, that is to say a movement progression of the projection of the traffic sign, on the basis of the first image and of the at least one second image. The movement progression in the image coordinates can be determined for example such that an image position of the traffic sign in the image coordinates is determined in the first image and an image position of the traffic sign is determined in the at least one second image in image coordinates. A change in the image positions of the traffic sign between the two images resulting from travel of the motor vehicle on the road here provides the movement progression of the traffic sign. The movement progression of the captured traffic sign in the image coordinates here corresponds to an instantaneous movement progression or actual movement progression of the projection of the traffic sign in image coordinates. The time between two images which were recorded successively can be, for example, between 50 ms and 80 ms, in particular 60 ms. Consequently, an image position of the traffic sign can be determined for example every 60 ms.

In addition, the first movement progression characterizing the stationary traffic sign in the image coordinates is determined. The first characterizing movement progression here corresponds to a first prescribed movement progression that the projection of the traffic sign has if the traffic sign is a stationary traffic sign at the first estimated position. To determine the first characterizing movement progression, for example image positions of a specified stationary reference traffic sign can be determined at the first estimated position for the at least two images.

To identify the traffic sign as the stationary traffic sign, the instantaneous movement progression and the first prescribed movement progression can be compared to one another. To this end, for example, a distance between the image progressions can be determined in image coordinates. For example, if the instantaneous movement progression deviates from the first prescribed movement progression by at most a specified limit value, the captured traffic sign can be identified as the stationary traffic sign. Otherwise the captured traffic sign is identified as a dynamic traffic sign and consequently as the traffic sign sticker. By determining whether the traffic sign is a static or dynamic traffic sign, it can be classified in the environment region with particular reliability from captured images of the environment region.

It proves advantageous if additionally a second position of the traffic sign in the environment region is estimated on the basis of the first image and on the basis of a second predetermined reference dimension of the stationary traffic sign, a second movement progression characterizing a stationary traffic sign in the image coordinates is determined on the basis of the second estimated position in the environment region, and the captured traffic sign is classified as the stationary traffic sign or as the traffic sign sticker on the basis of the comparison of the movement progression of the captured traffic sign to the second characterizing movement progression.

As has already been described, the distance of the traffic sign cannot be determined accurately on the basis of the two-dimensional images captured by the camera, but can vary in particular along the camera axis. The two possible, plausible positions or distances of the traffic sign from the motor vehicle are therefore estimated. Next, it is possible in addition to the first characterizing movement progression in image coordinates, which is determined for the stationary reference traffic sign at the first position in world coordinates, for the second characterizing movement progression in image coordinates for the reference traffic sign to be determined at the second position in world coordinates. The second characterizing movement progression here corresponds to a second prescribed movement progression that the traffic sign has if the traffic sign is a stationary traffic sign at the second estimated position. In addition, the instantaneous movement progression can be compared to the second prescribed movement progression, and the captured traffic sign can be identified as being static if the instantaneous movement progression deviates from the second prescribed movement progression by at most the specified limit value. By determining the second prescribed movement progression and comparing the instantaneous movement progression to the two prescribed movement progressions, the method is designed to be particularly accurate and reliable.

It may be provided that, for determining a characterizing movement progression, a vehicle speed and/or a rotation rate of the motor vehicle around a vehicle yaw axis is captured. On the basis of the vehicle speed and/or the rotation rate it is thus possible, proceeding from the first estimated position and the second estimated position, to determine, for each time point at which an image is captured, the position of the traffic sign in the case of a stationary traffic sign in the world coordinate system, that is to say for example the position of the reference traffic sign, in the environment region relative to the motor vehicle, and to convert it into the image positions in the corresponding image coordinates of the image captured at the time point. Consequently, the image position of the reference traffic sign and consequently a prescribed image position which the captured traffic sign in the image has if the captured traffic sign is a stationary traffic sign can be determined for each image. The change in prescribed image positions between two images produces the prescribed movement progression, that is to say the movement progression characterizing a stationary traffic sign.

With particular preference, the captured traffic sign is identified as the stationary traffic sign if the movement progression of the captured traffic sign is located within a corridor that is formed by the first and the second characterizing movement progression, and otherwise is classified as the traffic sign sticker arranged on the industrial vehicle. In other words, this means that the first and the second characteristic movement progressions in the image coordinates form the corridor, that is to say a movement region, within which the captured traffic sign moves if it is the stationary traffic sign. The corridor can also be extended by a tolerance region, with the result that the captured traffic sign can be identified correctly as a stationary traffic sign even if the movement progression of the captured traffic sign is outside the corridor but within the tolerance range.

It may be provided that the characterizing movement progression is determined under the assumption that the motor vehicle is travelling on a level road. A level road in this context is understood to mean a road without bumps or potholes. In other words, it is assumed that the motor vehicle during travelling performs no pitch movement, that is to say no rotational movement about a vehicle transverse axis. It is thus possible to determine the characterizing movement progressions without the need to laboriously capture the pitch angle of the motor vehicle.

To this end, when comparing the movement progression of the captured traffic sign to the characterizing movement progression, in particular only image coordinates along a horizontal direction are compared. The invention is here based on the finding that, even if the captured traffic sign is a stationary traffic sign, the vertical image coordinates of the captured traffic sign can deviate significantly from the vertical image coordinates of the characterizing movement profile if the motor vehicle is travelling on an uneven road with bumps. Due to the uneven road, the motor vehicle performs a pitch movement while it is travelling, as a result of which the captured traffic sign in the image appears to move in the vertical direction. This apparent vertical movement of the captured traffic sign in the image coordinates can have the result that the instantaneous movement profile, which is determined on the basis of the image positions of the traffic sign, is located outside the corridor that is formed by the two characterizing movement progressions. In order to nevertheless be able to reliably classify the traffic sign, only the image coordinates in the horizontal direction are taken into consideration when examining whether the movement progression of the captured object is located within the corridor. The image coordinates in the vertical direction are disregarded. It is thus possible to reliably identify a captured traffic sign as a stationary traffic sign or as a traffic sign sticker even in the case of a road on which the motor vehicle performs a pitch movement for example due to potholes, in particular without the need to separately capture the pitch angle of the motor vehicle.

With particular preference, the traffic sign is recognized as the stationary traffic sign if in at least one of the images a post holding the traffic sign is recognized. Stationary traffic signs located at the roadside typically have posts that hold the traffic signs. Due to the post, which is typically not present in the case of traffic sign stickers, being recognized, the classification of the traffic sign on the basis of the estimated position can be checked in terms of plausibility and verified. The method is thus designed to be particularly reliable.

In a development of the invention, information provided by the traffic sign, in particular a maximum speed that applies in the environment region, can be made available to a driver assistance system for supporting a driver of the motor vehicle in the form of an input variable if the traffic sign has been classified as the stationary traffic sign, and is ignored if the traffic sign has been classified as the traffic sign sticker arranged on the industrial vehicle. In other words, this means that an assistance function is provided by the driver assistance system only if the traffic sign has a meaning that is relevant for the motor vehicle. Such an assistance function can be, for example, displaying the information provided in the traffic sign, for example the maximum speed or the speed limit on the road of the motor vehicle, on a display device of the vehicle. It is also possible for a warning notice to be output as the assistance function if a speed limit of the motor vehicle exceeds the maximum speed limit that applies to the road. Alternatively or in addition, it is possible to regulate the speed of the motor vehicle, as the assistance function, based on the speed information on the traffic sign. Traffic sign stickers that carry only information relating to the industrial vehicle are ignored by contrast and do not result in an assistance function of the driver assistance system.

The invention also relates to a computational apparatus for a driver assistance system of a motor vehicle, which is designed to perform a method according to the invention or an embodiment thereof. The computational apparatus can include an image processing device for analysing the images which have been captured by the camera and received by the computational apparatus. In addition, the computational apparatus can include a control device for providing predetermined assistance functions. The computational apparatus can be designed to be integrated in a control unit of the vehicle.

A driver assistance system according to the invention for a motor vehicle for classifying a traffic sign in an environment region of a motor vehicle as a traffic sign sticker that has been affixed to an industrial vehicle or as a stationary traffic sign comprises at least one camera for capturing an environment region of the motor vehicle and a computational apparatus according to the invention. The driver assistance system is in particular designed as a traffic sign recognition system.

The invention furthermore relates to a motor vehicle having a driver assistance system according to the invention. The motor vehicle is embodied in particular as a passenger motor vehicle. The at least one camera is in particular an external camera mounted on the motor vehicle.

The preferred embodiments introduced with respect to the method according to the invention, and the advantages thereof, correspondingly apply to the computational device according to the invention, to the driver assistance system according to the invention, and to the motor vehicle according to the invention.

Further features of the invention emerge from the claims, the figures and the description of the figures. The features and combinations of features that are cited in the description above and also the features and combinations of features that are cited in the description of the figures below and/or as shown in the figures alone can be used not only in the respectively indicated combination but also in other combinations or on their own without departing from the scope of the invention. Therefore, embodiments of the invention that are not explicitly shown and explained in the figures, but emanate and are producible from the explained embodiments by virtue of self-contained combinations of features, are also intended to be regarded as included and as disclosed. Embodiments and combinations of features that therefore do not have all the features of an independent claim as originally worded are also intended to be regarded as disclosed. Furthermore, embodiments and combinations of features that go beyond or differ from the combinations of features set out in the back-references of the claims, should be considered to be disclosed, in particular by the embodiments set out above.

In the figures.

In the figures, identical and functionally identical elements are provided with the same reference numerals.

Figure 1:
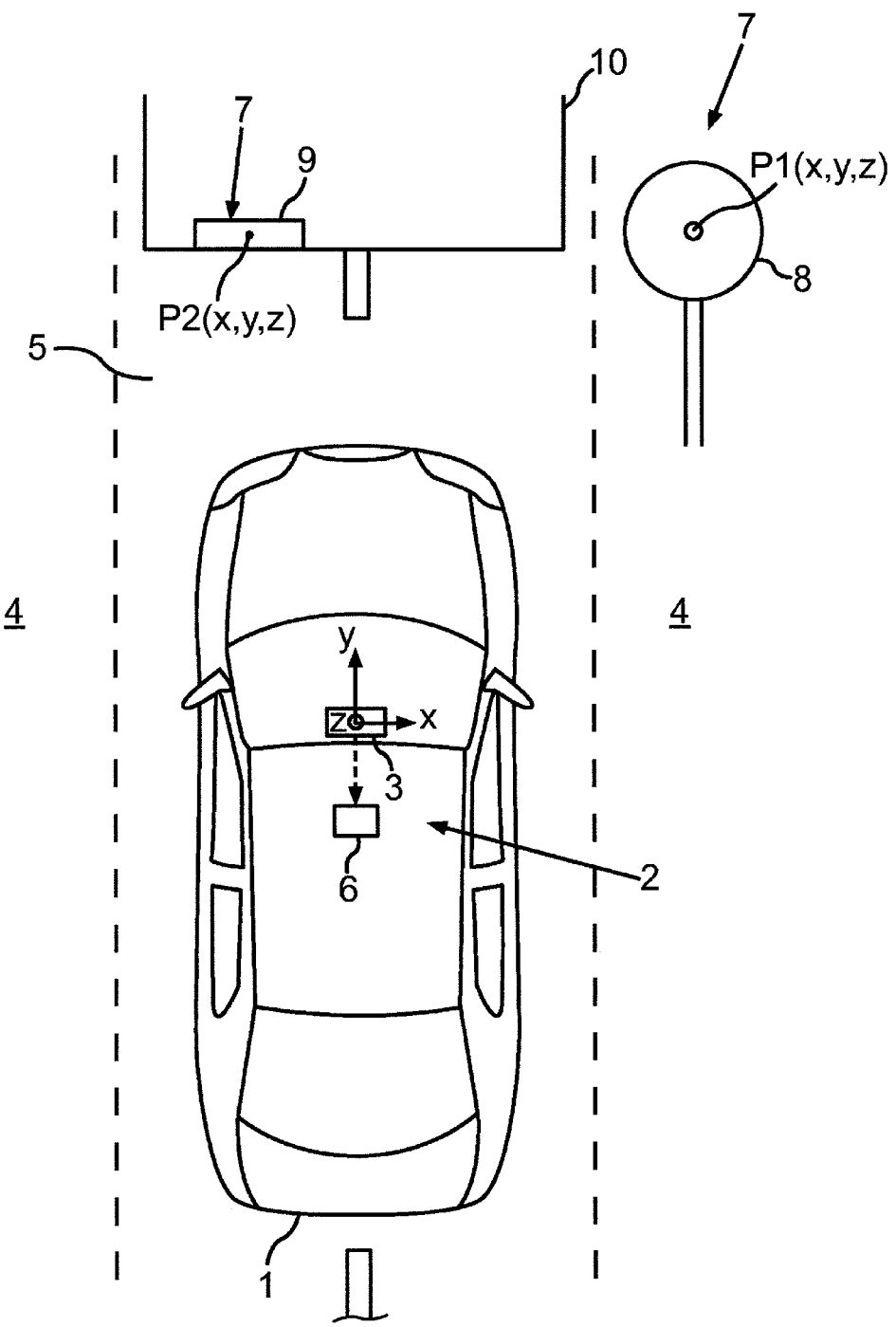
FIG. 1 shows a schematic illustration of an embodiment of a motor vehicle according to the invention.

FIG. 1 shows a motor vehicle 1 having a driver assistance system 2. The motor vehicle 1 in the present case takes the form of a passenger motor vehicle. The driver assistance system 2 comprises at least one camera 3, which is arranged on the motor vehicle 1 and is designed to capture an environment region 4 of the motor vehicle in two-dimensional images 11, 12 (see FIG. 2, FIG. 3). In particular, the camera 3 captures images of an environment region 4 located, in the direction of travel, in front of (y-direction) and laterally in front of (x-direction) the motor vehicle 1, while the motor vehicle 1 is travelling on a road 5.

The driver assistance system 2 additionally comprises a computational apparatus 6, which is designed to analyse the images 11, 12 of the environment region 4 which have been captured by the camera 3, for example to extract information from the captured images 11, 12. The driver assistance system 2 is in particular a traffic sign recognition system designed to recognize traffic signs 7 in the environment region 4. Based on a meaning of the traffic sign 7, for example a maximum speed applying to the road 5, the driver assistance system 2 can provide an assistance function, for example automatically regulate a speed of the motor vehicle 1 and/or output a notice signal if the speed of the motor vehicle 1 exceeds the maximum speed.

However, the assistance function is to be provided here by the driver assistance system 2 only if the traffic sign 7 is relevant for the motor vehicle 1, or has a meaning that is relevant for the motor vehicle 1. Such traffic signs 7 which are relevant for the motor vehicle 1 are for example stationary traffic signs 8 located at an edge of the road 5. Irrelevant traffic signs 7 are, for example, traffic sign stickers 9 on commercial or industrial vehicles 10, for example a lorry, a bus, or a trailer of another vehicle. This irrelevant information should be ignored by the driver assistance system 2.

The computational apparatus 6 is therefore designed to recognize the traffic sign 7 in the images 11, 12, which have been captured by the camera 3, for example using object recognition algorithms. The traffic sign 7 in the form of the stationary traffic sign 8 has, in the environment region 4, an actual position P1(x, y, z) relative to the motor vehicle 1. The traffic sign 7 in the form of the traffic sign sticker 9 has an actual position P2(x, y, z) relative to the motor vehicle 1. The positions P1, P2 are here three-dimensional positions in a world coordinate system x, y, z, which is here defined as a vehicle coordinate system. The x-axis of the world coordinate system x, y, z extends along a vehicle transverse direction, the y-axis along a vehicle longitudinal direction, and the z-axis along a vehicle vertical direction.

Figure 2:
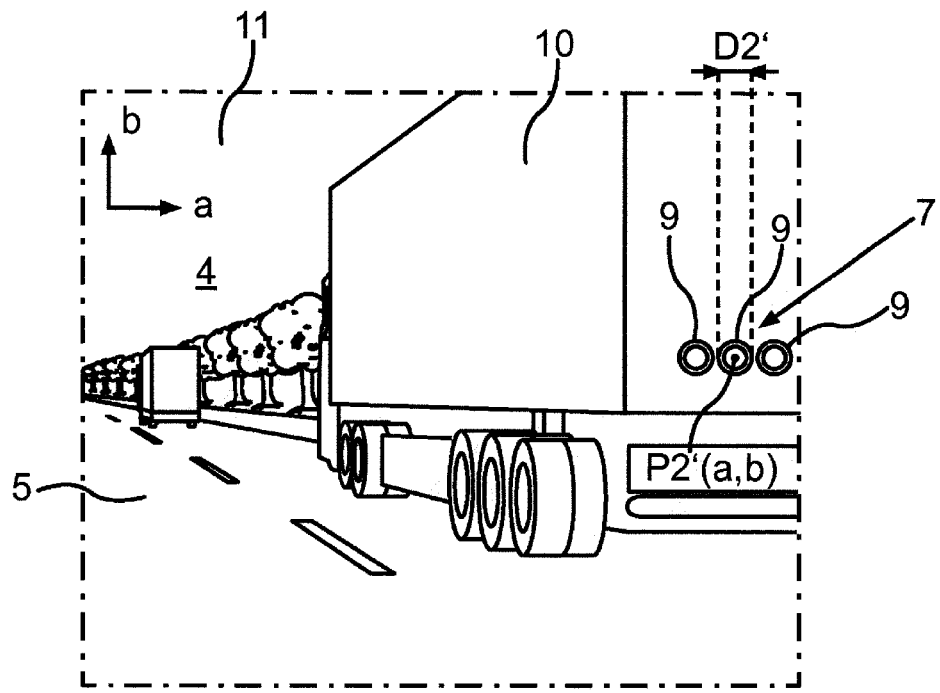
FIG. 2 shows a schematic illustration of an image of an environment region of the motor vehicle, depicting a traffic sign in the form of a traffic sign sticker.
Figure 3:
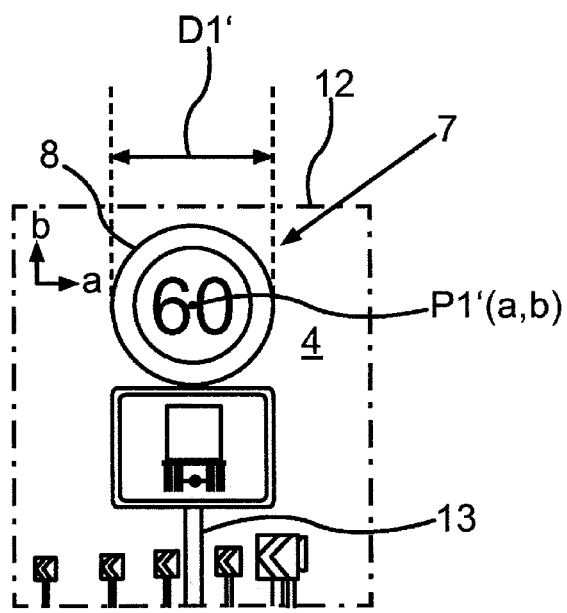
FIG. 3 shows a further schematic illustration of an image of the environment region of the motor vehicle, depicting a traffic sign in the form of a stationary traffic sign.

The computational apparatus 6 is designed to classify the traffic sign 7, in other words to identify whether the traffic sign 7 is a stationary traffic sign 8 with a fixed location in the environment region 4 or a traffic sign sticker 9, for example a speed sticker on the industrial vehicle 10. The traffic sign 7 is classified on the basis of the image 11, 12. FIG. 2 shows an image 11 of the environment region 4, recorded by the camera 3, with a first traffic situation, wherein the image 11 depicts the industrial vehicle 10 and the traffic sign 7 in the form of the traffic sign sticker 9 on the industrial vehicle 7. FIG. 3 shows an image 12 of the environment region 4, recorded by the camera 3, with a second traffic situation, wherein the image 12 here depicts the traffic sign 7 in the form of a stationary traffic sign 8.

Figure 4:
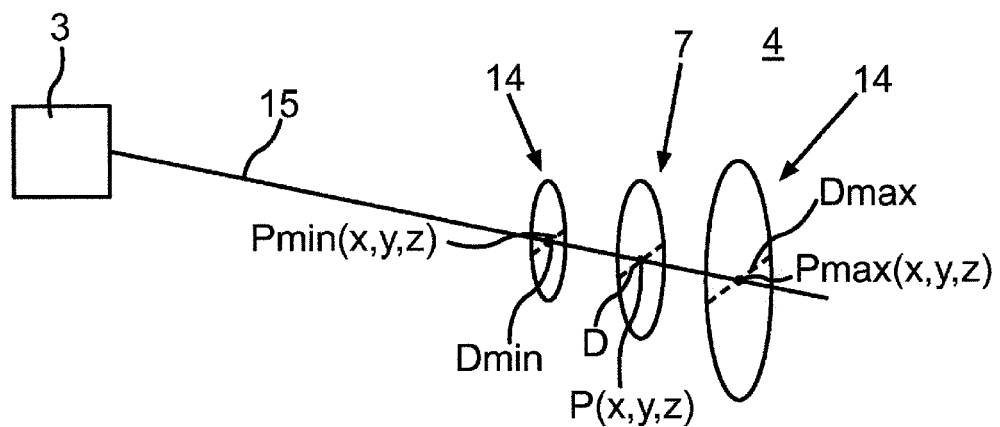
FIG. 4 shows a schematic illustration of an embodiment for classifying a captured traffic sign.
Figure 5:
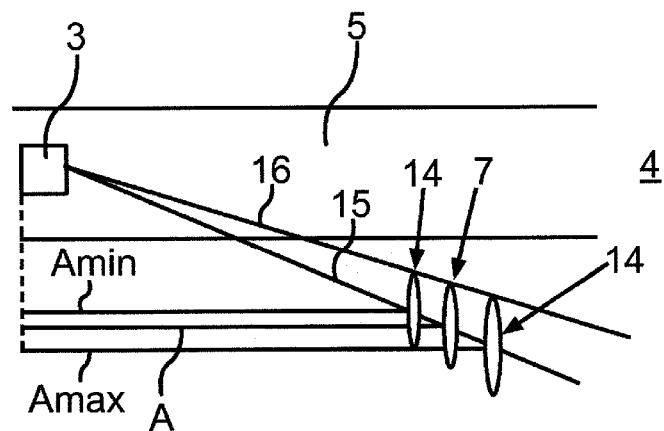
FIG. 5 shows a schematic illustration of a further embodiment for classifying a captured traffic sign.

For classifying the traffic sign 7, a geometric dimension of the respective traffic sign 7 is determined in the respective image 11, 12 in the image coordinates a, b. The traffic sign 8 in the image 12 has a diameter D1' as the dimension. The traffic sign sticker 9 has a diameter D2' in the image 11. On the basis of the dimension D1', D2' of the traffic sign 7, a position P(x, y, z) of the traffic sign 7 (see FIG. 4, FIG. 5) in the environment region 4 is then estimated. The position P(x, y, z) here does not necessarily correspond to the real, actual position P1, P2 of the traffic sign 7 in the environment region 4. This is because the position P(x, y, z) is determined by specifying a reference dimension Dmin, Dmax (see FIG. 4), which is characteristic of a stationary reference sign 14, for the dimension of the traffic sign 7, for example for the actual diameter D. In FIG. 4, for example a minimum diameter Dmin, which is plausible for a stationary reference traffic sign 14, and a maximum diameter Dmax, which is likewise plausible for the stationary reference traffic sign 14, are specified. The minimum diameter Dmin can be, for example, 40 cm, and the maximum diameter Dmax can be, for example, 2 m.

If the minimum diameter Dmin is assumed for the traffic sign 7 that has been captured in the image 11, 12, the position P(x, y, z) of the traffic sign 7 is determined, on the basis of the diameter D1', D2' of the traffic sign 7 in the image 11, 12, as a first position Pmin(x, y, z). If the maximum diameter Dmax is assumed for the traffic sign 7 that has been captured in the image 11, 12, the position P(x, y, z) of the traffic sign 7 is determined, on the basis of the diameter D1', D2' of the traffic sign 7 in the image 11, 12, as a second position Pmax(x, y, z). If a diameter that lies between the minimum diameter Dmin and the maximum diameter Dmax is assumed for the traffic sign 7 which has been captured in the image 11, 12, the position P(x, y, z) of the traffic sign 7 is determined, on the basis of the diameter D1', D2' of the traffic sign 7, to lie between the first and the second positions Pmin(x, y, z), Pmax(x, y, z).

Is then possible to determine from the positions Pmin and Pmax a minimum, lateral distance Amin and a maximum, lateral distance Amax of the traffic sign 7 relative to the motor vehicle. The position P(x, y, z) or a lateral distance A of the traffic sign 7 is here assumed to be located, along camera axes 15, 16, between the two positions Pmin, Pmax or the distances Amin, Amax. The camera axis 15 here extends through a centre of the traffic signs 7, 14, and the camera axis 16 extends tangentially to a periphery of the traffic signs 7, 14.

The distance A is then compared to a predetermined threshold value. If the captured traffic sign 7 is the traffic sign 8 from FIG. 3, the position P(x, y, z) represents approximately the actual position P1 of the traffic sign 7 in the environment region 4, and the distance A falls below the predetermined threshold value. This is the result of the fact that the position P(x, y, z) is determined by assuming that the diameter D1' is a reference diameter Dmin, Dmax that is characteristic of the stationary traffic sign 8, or is a value that lies between the two. The assumption that the diameter D1' is a reference diameter Dmin, Dmax that is characteristic of the stationary traffic sign, or is a value that lies between the two, is correct here because the traffic sign 7 in the image 12 is such a stationary traffic sign 8. The determined distance A falls below the threshold value and is therefore assumed to be plausible. Consequently, the information provided by the traffic sign 7 is also considered to be relevant for the motor vehicle 1.

However, if the captured traffic sign 7 is the traffic sign sticker 9 from FIG. 2, the position P(x, y, z) does not represent the actual position P2 of the traffic sign 7 in the environment region 4, and the distance A exceeds the predetermined threshold value. The assumption that the diameter D2' is a reference diameter Dmin, Dmax that is characteristic of the stationary traffic sign 14, or is a value that lies between the two, is not correct here because traffic sign stickers 9 generally have significantly smaller diameters than traffic signs 8. Therefore, the traffic sign 7 for which the diameter Dmin, Dmax that is characteristic of the stationary traffic sign 14 was assumed appears to be significantly farther away. As a consequence, the distance A exceeds the threshold value and is assumed to be implausible. Consequently, the information provided by the traffic sign 7 is also considered to be irrelevant for the motor vehicle 1 and is ignored. In other words, if the distance A falls below the threshold value, the traffic sign 7 is classified to be the traffic sign 8, and if the distance A exceeds the threshold value, the traffic sign 7 is classified to be the traffic sign sticker 9.

If a post 13 holding the traffic sign 7 is recognized in the images 11, 12, such as here in the image 12 of FIG. 3, the traffic sign 7 can be classified to be the stationary traffic sign 8. The classification of the traffic sign 7 can thus be checked and verified by way of the recognition of the post 13.

Alternatively or additionally to the classification of the traffic sign 7 on the basis of the distance Amin, Amax, A, it is possible to determine on the basis of the images 11, 12 whether the traffic sign 7 is static and consequently is the traffic sign 8, or whether it is dynamic and consequently the traffic sign sticker 9. To this end, a respective movement progression of the traffic sign 7 is determined on the basis of the images 11, 12. For example, a movement progression of the traffic sign sticker is determined in the image coordinates a, b on the basis of the image 11 and on the basis of an image that has been recorded before the former in terms of time (not illustrated here) and likewise depicts the first traffic situation with the industrial vehicle 10 and the traffic sign sticker 9. It is possible here to determine a change in an image position P2'(a, b) of the traffic sign 7 between the image 11 and the previously recorded image in the image coordinates a, b. It is also possible to determine a movement progression of the traffic sign 8 on the basis of the image 12 and on the basis of an image which was recorded for example before the former in terms of time and depicts the second traffic situation with the traffic sign 8. It is possible to this end to determine a change in an image position P1'(a, b) of the traffic sign 8 between the image 12 and the previously recorded image in the image coordinates a, b.

In addition, proceeding from the first estimated position Pmin and the second estimated position Pmax, it is possible to determine movement progressions which are characteristic of a stationary traffic sign, for example of the reference traffic sign 14, in image coordinates a, b. The first characterizing movement progression is here characteristic of the stationary reference traffic sign 14 at the first, estimated position Pmin, and the second characterizing movement progression is characteristic of the stationary reference traffic sign 14 at the second, estimated position Pmax. The characterizing movement progressions are determined by determining for example the image positions of the stationary reference traffic sign 14 in the images 11, 12 in image coordinates a, b. To this end, the first position Pmin and the second position Pmax for the image positions of the stationary reference traffic sign 14 in the respective image 11, 12 are converted to image coordinates a, b. The characteristic movement progressions can be determined for example on the basis of the instantaneous speed of the motor vehicle 1. In addition, the characterizing movement progressions are determined on the assumption that the road 5 on which the motor vehicle 1 is travelling is level and has no potholes or bumps, for example.

The two determined characteristic movement progressions form a corridor, wherein the captured traffic sign 7 is identified as being static if the movement progression of the captured traffic sign 7 is located within the corridor, and otherwise is identified as being dynamic. The captured traffic sign 7 is thus identified as the stationary traffic sign 8 if the movement progression of the captured traffic sign 7 is located within the corridor, and is otherwise identified as the traffic sign sticker 9. The movement progression which is determined on the basis of image 11 and the image of the same traffic situation which was captured before the former in terms of time will be located outside the corridor, which means that the traffic sign 7 is identified as the traffic sign sticker 9. The movement progression which is determined on the basis of image 12 and the image of the same traffic situation which was captured before the former in terms of time will be located within the corridor, which means that the traffic sign 7 is identified as the stationary traffic sign 8.

The invention claimed is:

1. A method for classifying a traffic sign in an environment region of a motor vehicle as one of a traffic sign sticker located on an industrial or commercial vehicle or as a stationary traffic sign, the method comprising:
   receiving at least one first image of the environment region captured by a camera of the motor vehicle;
   detecting the traffic sign in the at least one first image;
   determining a geometric dimension of the traffic sign in the first image on the basis of said first image;
   prescribing a first reference dimension characteristic of a stationary traffic sign for the captured traffic sign;
   estimating a first position of the traffic sign in the environment region based on the geometric dimension of the traffic sign in the first image and on the basis of the first reference dimension; and
   classifying the traffic sign as the traffic sign sticker or as the stationary traffic sign based on the estimated first position,
   wherein a movement progression of the traffic sign in the images is determined in image coordinates on the basis of the first image and at least one second image, which has been captured by the camera, a first movement progression characterizing a stationary traffic sign is determined in the image coordinates proceeding from the first estimated position in the environment region, and the captured traffic sign is classified as the stationary traffic sign or as the traffic sign sticker on the basis of a comparison of the movement progression of the captured traffic sign to the first characterizing movement progression.

2. The method according to claim 1, further comprising:
   specifying a second reference dimension characteristic of the stationary traffic sign for the captured traffic sign;
   estimating a second position in the environment region on the basis of the dimension of the traffic sign in the image and on the basis of the second reference dimension; and
   classifying the traffic sign as the traffic sign sticker or the stationary traffic sign on the basis of the estimated first and second positions.

3. The method according to claim 1, wherein a predetermined minimum diameter of 40 cm, characteristic of the stationary traffic sign, is specified as the first reference dimension, and a predetermined maximum diameter of 2 m, characteristic of the stationary traffic sign, is specified as a second reference dimension.

4. The method according to claim 1, wherein a distance between the traffic sign and the motor vehicle is determined at least on the basis of the first position and the traffic sign is classified as the stationary traffic sign when the distance falls below a predetermined threshold value, and the traffic sign is classified as the traffic sign sticker when the distance at least exceeds the predetermined threshold value.

5. The method according to claim 1, wherein a second position of the traffic sign in the environment region is additionally estimated on the basis of the first image and on the basis of a second predetermined reference dimension of the stationary traffic sign, a second movement progression characterizing a stationary traffic sign in the image coordinates is determined on the basis of the second estimated position in the environment region, and the captured traffic sign is classified as the stationary traffic sign or as the traffic sign sticker on the basis of the comparison of the movement progression of the captured traffic sign to the second characterizing movement progression.

6. The method according to claim 5, wherein the captured traffic sign is identified as the stationary traffic sign if the movement progression of the captured traffic sign is located within a corridor that is formed by the first and the second characterizing movement progression, and otherwise is classified as the traffic sign sticker arranged on the industrial vehicle.

7. The method according to claim 5, wherein the first and second characterizing movement progressions are determined under the assumption that the motor vehicle is travelling on a level road.

8. The method according to claim 7, wherein, when comparing the movement progression of the captured traffic sign to the first and second characterizing movement progressions, only image coordinates along a horizontal direction are compared.

9. The method according to claim 1, wherein the traffic sign is recognized as the stationary traffic sign if in at least one of the images a post holding the traffic sign is recognized.

10. The method according to claim 1, wherein information provided by the traffic sign including a maximum speed that applies in the environment region, is made available to a driver assistance system for supporting a driver of the motor vehicle in the form of an input variable if the traffic sign has been classified as the stationary traffic sign, and is ignored if the traffic sign has been classified as the traffic sign sticker arranged on the industrial vehicle.

11. A computational apparatus for a driver assistance system of a motor vehicle, configured to:
receive at least one first image of the environment region captured by a camera of the motor vehicle;
detect the traffic sign in the at least one first image;
determine a geometric dimension of the traffic sign in the first image on the basis of said first image;
prescribe a first reference dimension characteristic of a stationary traffic sign for the captured traffic sign;
estimate a first position of the traffic sign in the environment region based on the geometric dimension of the traffic sign in the first image and on the basis of the first reference dimension; and
classify the traffic sign as the traffic sign sticker or as the stationary traffic sign based on the estimated first position,
wherein a movement progression of the traffic sign in the images is determined in image coordinates on the basis of the first image and at least one second image, which has been captured by the camera, a first movement progression characterizing a stationary traffic sign is determined in the image coordinates proceeding from the first estimated position in the environment region, and the captured traffic sign is classified as the stationary traffic sign or as the traffic sign sticker on the basis of a comparison of the movement progression of the captured traffic sign to the first characterizing movement progression.

12. A driver assistance system for a motor vehicle for classifying a traffic sign in an environment region of the motor vehicle as one of a traffic sign sticker that is affixed to a commercial or industrial vehicle or a stationary traffic sign, the driver assistance system comprising:
at least one camera for capturing at least one first image of the environment region; and
a computational apparatus according to claim 11.

13. A motor vehicle having a driver assistance system according to claim 12.

* * * * *